United States Patent
Allen et al.

[15] 3,696,414
[45] Oct. 3, 1972

[54] CORRELATORS HAVING A TIME COMPRESSED ANALOGUE REFERENCE

[72] Inventors: Willard B. Allen; Charles E. Persons; Marshall K. Brandon, all of San Diego, Calif.

[73] Assignee: The United States of America as represented by the Secretary of the Navy

[22] Filed: April 6, 1971

[21] Appl. No.: 131,623

[52] U.S. Cl. ............... 343/5 R, 340/3 D, 343/100 CL
[51] Int. Cl. ............................................. G06f 7/04
[58] Field of Search .......... 343/5 R, 100 CL; 340/3 D

[56] References Cited

UNITED STATES PATENTS

| | | | |
|---|---|---|---|
| 3,276,015 | 9/1966 | Lerwill et al. | 343/100 CL |
| 3,521,044 | 7/1970 | Costas | 343/100 CL |
| 3,646,334 | 2/1972 | Wold | 343/100 CL |

*Primary Examiner*—Benjamin A. Borchelt
*Assistant Examiner*—G. E. Montone
*Attorney*—Richard S. Sciascia, Ervin F. Johnston and Thomas G. Keough

[57] ABSTRACT

A separate reference generator, operated from an independent clock oscillator, is selectively controllable to generate different time-compressed reference signals for comparison to received signals during each recirculation of a time compressor circuit. Since the selectively variable reference signal is an analogue signal, the output of a correlation processor is linearly related to a correlation coefficient existing between the reference signal and the received signal, for signals with Gaussian characteristics. Having the reference signal derived from a clock oscillator in the correlation processor, that is distinct from the oscillator generating the transmitted signal, allows variation of the reference signal's waveform, particularly with respect to phase, to provide correlation with doppler-shifted received signals. A real-time correlation signal processor, utilizing a single time compressor in the receive channel, and a separate signal generator in the reference channel cooperate to correlate time-compressed replicas of the transmitted signal with a reference signal having substantially the same frequency. The complexity of the real-time active correlation signal processor circuitry is reduced and its flexibility and usefulness for a wider number of applications is increased.

6 Claims, 4 Drawing Figures

CORRELATORS HAVING A TIME COMPRESSED ANALOGUE REFERENCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In contemporary sonar transceiver systems, a low frequency signal, of up to several seconds duration, is projected from a transducer and the reflected signal is picked up by a hydrophone. The circuitry for processing the reflected signal is usually quite complex due to the wide bandwidths, signal shifts, and information content of the reflected signals. Correlation between the transmitted signal and the reflected signal is highly desirable to permit an evaluation of the validity of the reflected signal with respect to distortion, interference, or decoy emissions. In one real-time correlator, "T" seconds of the transmitted signal are time-compressed and stored in a recirculating delay line and used as a reference signal. The reflected signal is also time-compressed in a recirculating delay line, but the stored signal is continuously updated so that only the last "T" seconds are retained, and the outputs of the two time-compressors are multiplied together and time-averaged to obtain a measure of their correlation. This system is complex because a storage of the reflected and reference signals each require elaborate delay line circuitry having the capability to store from 100 to 5,000 words, each consisting of from one to eight bits. Should a different distortion of the new transmitted signal occur between source and receiver, a new reference signal is created only by a time-consuming time-compression and storage of a new reference signal. Obviously, a limitation of this approach exists when the reference is to be changed since a new reference must be generated and time-compressed, requiring a time equal to the effective averaging time of the system.

In another type real-time correlation system, the reference signal is produced by a recycling binary code generator that is identical to the binary code generator used to modulate the transmit carrier with the only exception being that the clock frequency of the former is "N" times that of the latter. While this technique reduces the complexity of the correlation system, and ensures automatic time-compression of both the transmitted and reference signals, a prohibitive limitation becomes apparent. With this arrangement, the clock frequencies for the transmit signal and the reference signal generators, as well as the time compressor, are derived from the same master oscillator and their ratios are fixed. Thus, the reference clock frequency is incapable of being changed to match doppler-compressed or expanded versions of the reflected, transmitted signal.

SUMMARY OF THE INVENTION

The invention is directed to providing a real-time signal processor for correlating reflected signals with reference signals, and includes a first oscillator providing a stable, high frequency signal. A pulse and control generator, responsive to the first oscillator, actuates a transmitter oscillator to transmit signals. A receiver circuit, responsive to reflected, transmitted signals, gates them into a recycling time-compressor when appropriately actuated by the pulse control generator. The reflected signals are time-compressed in the time compressor at a rate determined by the first oscillator, and fed to a multiplier for correlation with a reference signal. The reference signal is generated under control of a separate oscillator and has a frequency substantially corresponding to the time-compressed, reflected signals. This signal is fed to the multiplier and a real-time correlation of the time-compressed, reflected signals and the reference signal is provided for following circuitry.

An object of the invention is to provide a real-time signal processor for correlating signals formed of a minimal amount of components.

Another object of the invention is to provide a correlation processor having the capability to correlate doppler-shifted, reflected signals with an internally generated reference signal that can be readily changed.

Yet another object is to provide a real-time correlation system time-compressing a reflected signal for comparison with a self-generated reference signal of substantially the same frequency.

Still another object is to provide a real-time correlation processor using a minimum of time-compressor circuits.

These and other objects of the invention will become more readily apparent from the ensuing description when taken with the drawings.

DESCRIPTION OF THE PREFERRED EMBODIMENT

Figure 1:
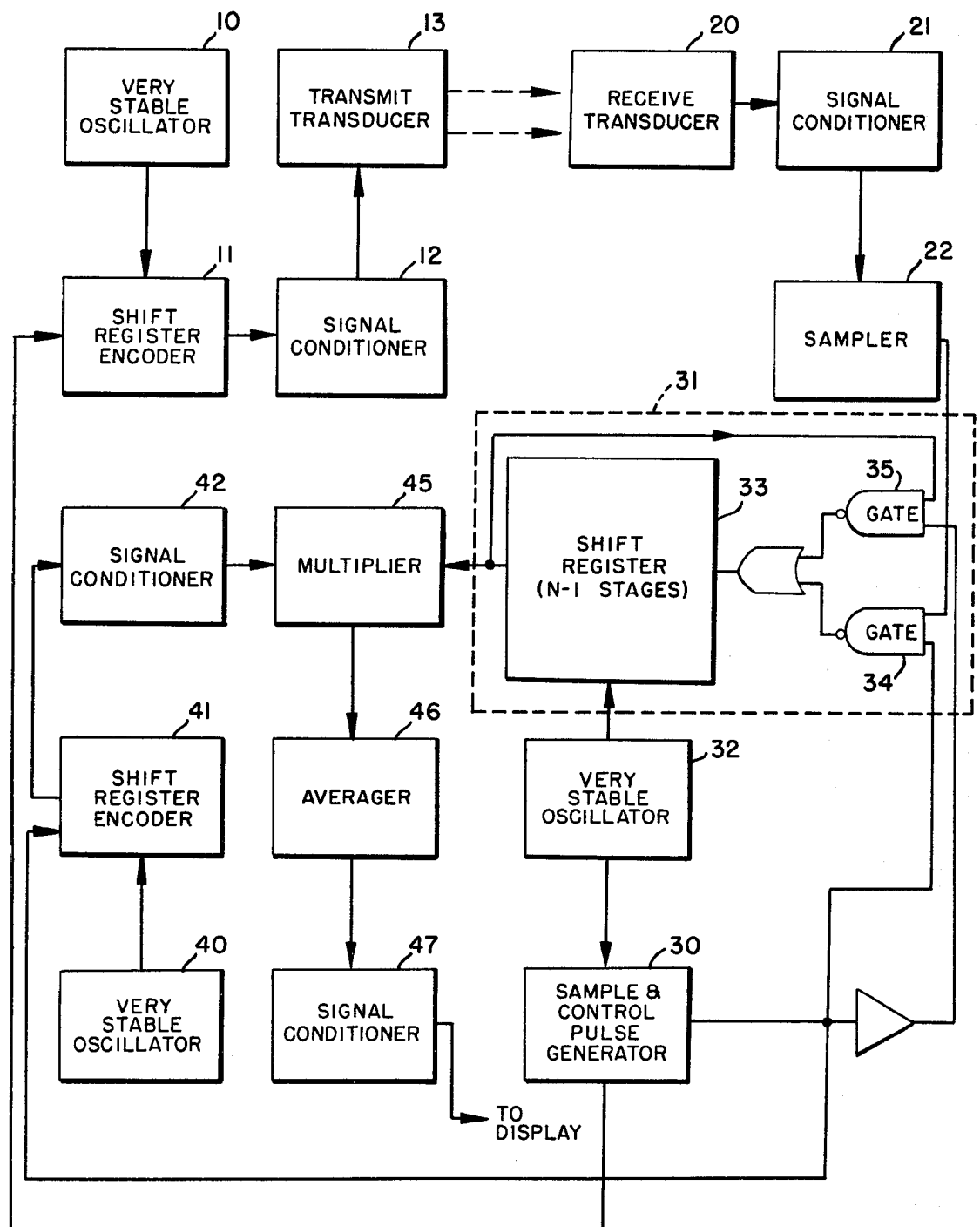
FIG. 1 is a block diagram of a representative embodiment of the invention.
Figure 2:
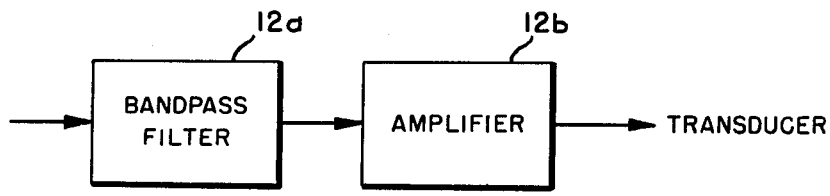
FIGS. 2, 3, and 4 are block diagrams of the signal conditioners set out in FIG. 1.
Figure 3:
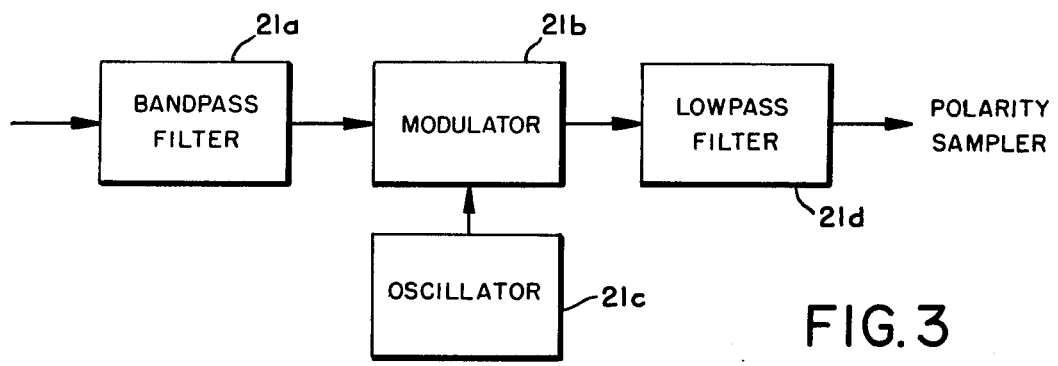
Figure 4:
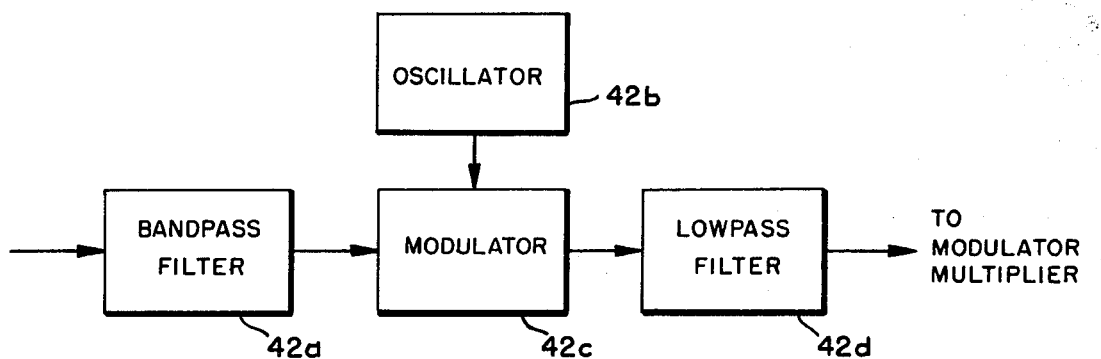

Referring now to FIG. 1 of the drawings, a portion of an integrated sonar transceiver unit is depicted in block form, and includes the basic components of a variety of such units found aboard ship for detection and communication purposes.

On the transmit side of the unit, a very stable oscillator 10 provides a clock frequency of $f$ hertz and provides the driving source for a shift register encoder 11. In one form, the shift register encoder is a pseudorandom noise generator having a pulse train, bandwidth, and recycling time determined by its physical configuration, number of stages, and the driving frequency $f$ of oscillator 10. Initiation of the transmitted signal is set to occur whenever the encoder receives a pulse signal from a sample and control pulse generator 30. The rate at which the pulse signal is fed to the encoder is selectably variable and dependent upon the information content of the transmitted signal, or the length of the pulse train generated by the shift register encoder among other things.

A signal conditioner 12 is coupled to receive the shift register encoder output and, optionally, is no more than a bandpass filter 12a having a passband between $f_1$ and $f_2$ hertz coupled to a power amplifier circuit 12b.

The amplified bandwidth-limited signal is fed to a conventional, magnetostrictive or piezoelectric transmit-transducer 13 for transmission through a surrounding medium.

A hydrophone, or receive transducer 20, converts reflected, transmitted, acoustic signals to representative electrical signals and feeds the reflected signals to a signal conditioner 21. Here again, the signal conditioner is a bandpass filter 21a, having substantially the same passband as the bandpass filter 12a; however, the efficient processing of the reflected signals, to give the invention a real-time capability, dictates that the center frequency of the reflected energy is lowered to a lower passband $(f_1 - f_d)$ to $(f_2 - f_d)$ where $f_d$ is a translating frequency.

Such a signal translation occurs in a frequency modulator unit 21b driven by an oscillator 21c, its driving frequency being $f_d$. The logic behind making this signal translation becomes more clear when one observes that the sample pulse rate of the sample and control pulse generator 30 is relatively low when compared to the center frequency of the reflected signal.

Since the sampling and control pulse rate have this pre-established set rate, by circuitry to be elaborated on below, the frequency range of the sampled reflected signal must be lowered to retain all the included information when sampled according to the Shannon sampling rate $(f_s)$ (equal to 2 $(f_2 - f_d)$ bits per second in this case). At this sampling rate, either signal axis-crossing information, or axis-crossing and amplitude information is retained. Once the information content of the received signal is so translated and limited, a low pass filter 21d, optionally, is included to further mask spurious signals from the following circuitry.

A recycling time-compressor 31 is responsive to the received sample of the reflected signal to effect a signal-time compression a multiple of "N" times the sampling rate. Such a time-compressor circuit is, optionally, a DELTIC circuit, fully described in the U.S. Pat. No. 2,958,039 to V. C. Anderson, entitled: "Delay Line Time Compressor," or an ASTIC circuit, disclosed in the U.S. Pat. No. 3,093,796 to E. C. Westerfield. In either case, the recycling time-compressor is shifted by a very stable oscillator 32 having a shifting frequency "$Nf_s$." A shift register 33 included in the time-compressor has "N" −1 stages and when shifted at the "$Nf_s$" rate, a first sample of the reflected signal fed to an input gate 34 will have been shifted "N" stages in the shift register via input gate 34. This shifting sequence recirculates the first sample from the shift register output to a second input gate 35 to enable the adding of the second sample signal immediately behind the first sample. An inhibit pulse from the sample and control pulse generator is fed to the other input of input gate 35 at the same time the sampler and input gate 34 are enabled. Thus, the output waveform of each recirculation of the recycling time compressor is a time-compressed replica of the latest "N" samples, that is to say, the input waveform is time-compressed by a factor of "N" in the time compressor.

Generation of the reference signal for correlation with the time-compressed, reflected signals results from the inclusion of a third stable oscillator 40 having a clock frequency "N" times the clock frequency of first stable oscillator 10. Driving a reference shift register encoder 41, a pseudorandom noise generator being identical to shift register encoder 11, provides a time-compressed broadband replica of the transmitted signal. Shift register encoder 41 is reset to the all "1" state by a control pulse originating from sample and control pulse generator 30 whenever a reflected signal sample is gated into shift register 33.

A following signal conditioner 42 is connected to receive the output of encoder 41 to provide a function similar to signal conditioner 21 by having a bandpass filter 42a and an oscillator-modulator combination 42b and 42c, which serve to bring the reference signal within the frequency and bandwidth limits of the time-compressed reflected signal. A following low pass filter 42d tends to eliminate unwanted signals and limit the bandwidth of the reference signals.

A multiplier circuit 45, e.g., a conventional phase modulator, receives the analogue reference signal and the binary level signal from the time-compressor and multiplies the two signals together. The product of the two signals is fed to a time-averaging circuit 46 to provide a maximum correlation signal when both signals are in phase and in step. Deviations from this condition result in proportionally lower signals.

In any event, the correlation signal is coupled to a signal conditioner 47, which, in one form, is a quantzer, to produce a digital representation of the correlation for remotely located readout. The readout, if visually monitored, provides information from which an operator determines such things as relative speed of a tracked target or the relative motion of the supporting platform itself.

Any doppler shift in the reflected signal is matched by merely changing the clock frequency of the stable oscillator 40 to allow a closer analysis of the information content of the reflected signals. A voltage-controlled oscillator, capable of being precisely changed to match the reference signals to the frequency shifted reflected signals, is well-known within the art for adoption here.

Having a separate stable oscillator 40 reduces the complexity of DELTIC correlators for active signal processes, or processors in which time-compressed replicas of the expected incoming signal are generated since only a single time-compressor is required. Furthermore, having the independent third stable oscillator allows the generation of a reference signal as it is used so that, if the frequency of the first stable oscillator is changed or the reflected signal distorted, the reference clock frequency of the third stable oscillator can be changed immediately to match the characteristics of the transmitted signal. Greater system flexibility is provided by including the invention for the length of the shift register feedback loops in the shift register encoder 41 can be electronically lengthened or shortened between recirculations of the time-compressor to permit the comparison of different reference signals with the incoming reflected sample signals on each recirculation. This technique is particularly useful if the time-compressor recirculates several times between the addition of each new signal sample so several references can be compared with the time-compressor incoming signal before it is updated.

While the description has dealt with active correlators using shift register encoder signal generators, the technique is applicable to any type information signal that is readily generated in the desired signal band for transmission and as a time-compressed reference. Optionally, some of these signals will carry signal amplitude, as well as axis-crossing information in the signal time-compressor. The invention is modifiable to be used in difference frequency, quadrature, and conventional DC correlators, although it is understood that with these different modes, conditioners, multipliers, and time averagers must necessarily be suitably modified.

Obviously, many modifications and variations of the present invention are possible in the light of the above teachings, and, it is therefore understood that within the scope of the disclosed inventive concept, the invention may be practiced otherwise than as specifically described.

What is claimed is:

1. A real time signal processor for correlating reflected doppler shifted signals with reference signals comprising:

first oscillator means for providing a stable high frequency signal;

means connected to said first oscillator means for generating sample pulse signals and control signals, each of which is a submultiple of said high frequency signal;

a transmitting circuit coupled to receive said pulse signals having a second oscillator means initiated thereby for projecting signals;

a receiver circuit responsive to the doppler shifted reflections of the projected signal to provide a representative signal;

a recycling time compressor having input gate means coupled to the generating means for gating in the reflected doppler shifted signals at a rate equal to said sample pulse signals and further being coupled to said first oscillator means for shifting gated said reflected doppler shifted signals at a rate equal to said stable high frequency thereby effecting a time compression;

third oscillator means coupled to said generating means and responsive to said control signals to provide said reference signals having a frequency corresponding to the time compressed reflected signals; and means coupled to receive said time compressed reflected signals and said reference signals to provide a representation of their correlation.

2. A processor according to claim 1 in which said receiver circuit includes bandwidth limiting means and signal translation circuitry for translating the frequency range of the reflected signals to a lower frequency range.

3. A processor according to claim 2 in which said second oscillator means includes a second oscillator and a shift register encoder for transmitting signals and said third oscillating means includes a third oscillator and a shift register encoder for providing said reference frequency being "N" times said lower frequency range.

4. A processor according to claim 3 in which the correlation providing means is a phase modulator responsive to analogue said reference signals and binary level said time compressed reflected signals.

5. A processor according to claim 4 in which said third oscillator means is a voltage controlled oscillator being selectively controlled to accommodate said reflected doppler shifted signals to provide a maximum correlation signal.

6. A processor according to claim 5 in which said first oscillator means provides said stable high frequency "$Nf_s$" snd said time compressor includes a shift register having "N" $-1$ stages connected to said first oscillator to be shifted at the "$Nf_s$" rate.

* * * * *